United States Patent [19]

Ogasawara et al.

[11] Patent Number: 5,894,189
[45] Date of Patent: Apr. 13, 1999

[54] COLD ELECTRON EMISSION DISPLAY DEVICE

[75] Inventors: Kiyohide Ogasawara; Takamasa Yoshikawa, both of Tsurugashima; Nobuyoshi Koshida, Tokyo, all of Japan

[73] Assignee: Pioneer Electronic Corporation, Tokyo, Japan

[21] Appl. No.: 08/813,211

[22] Filed: Mar. 7, 1997

[30] Foreign Application Priority Data

Mar. 26, 1996 [JP] Japan .................................. 8-069602

[51] Int. Cl.$^6$ .................................................. H01J 1/05
[52] U.S. Cl. .......................... 313/310; 313/495; 313/309
[58] Field of Search .................................. 313/495, 309, 313/310, 336, 351

[56] References Cited

U.S. PATENT DOCUMENTS 5,652,474  7/1997  Wilshaw et al. ..................... 313/309

*Primary Examiner*—Sandra O'Shea
*Assistant Examiner*—Vip Patel
*Attorney, Agent, or Firm*—Fish & Richardson P.C.

[57] ABSTRACT

A surface cold electron emission display device includes; a pair of an element-substrate and a transparent substrate sandwiching a vacuum space and facing to each other; plural ohmic electrodes disposed on the element-substrate parallel to each other; and plural cold electron emission elements made of semiconductor. Each cold electron emission element includes; a semiconductor layer formed on the ohmic electrode; a porous semiconductor layer formed on the semiconductor layer; and a metallic thin film electrode formed on the porous semiconductor layer to face the vacuum space. The device also includes; a plurality of bus electrodes formed on the metallic thin film electrodes for bridging and electrically connecting the adjacent metallic thin film electrodes and extending perpendicular to the ohmic electrodes; a plurality of collector electrode disposed on the transparent substrate parallel to each other for capturing emitted electrons from the metallic thin film electrode; and a fluorescent layer formed on the collector electrode.

11 Claims, 7 Drawing Sheets

THICKNESS OF THIN FILM ELECTRODE (Å)

5,894,189

1

COLD ELECTRON EMISSION DISPLAY DEVICE

BACKGROUND OF THE INVENTION

1. Field of the Invention

The present invention relates to a cold electron emission display device comprising electron emission elements comprising a semiconductor.

2. Description of the Related Art

There is known a FED (field emission display) as a surface-light-emitting display comprising an array of cold electron emission sources without any necessity of heating the cathode. A principle of light-emission in the FED is similar to that of a CRT (cathode ray tube) except for the cathode structure of the cold electron emission source array. That is, the gate electrodes draw electrons from the separate cathodes to the vacuum space and then the electrons travel and impinge upon the fluorescent material disposed on the transparent anode, so that the fluorescent material emits light.

However, there is a problem of a low yield rate in the manufacture of FED, because the field emission source array requires complicated many processes for the manufacture in which each minute cold cathode projecting to the vacuum should be micro-machined.

SUMMARY OF THE INVENTION

It is, therefore, an object of the invention to provide a cold electron emission display device using a cold electron emission element with a high light-emitting efficiency without any minute cold cathode projecting to the vacuum.

The object may be achieved by using a cold electron emission display device comprising;

a pair of an element-substrate and a transparent substrate sandwiching a vacuum space and facing to each other;

a plurality of ohmic electrodes disposed on said element-substrate parallel to each other;

a plurality of cold electron emission elements of semiconductor each comprising;

a semiconductor layer formed on said ohmic electrode;

a porous semiconductor layer formed on said semiconductor layer; and a metallic thin film electrode formed on said porous semiconductor layer to face said vacuum space;

a plurality of bus electrodes formed on said metallic thin film electrodes for bridging and electrically connecting the adjacent metallic thin film electrodes and extending perpendicular to said ohmic electrodes;

a plurality of collector electrode disposed on said transparent substrate parallel to each other for capturing emitted electrons from said metallic thin film electrode; and a fluorescent layer formed on said collector electrode.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms.

2

Figure 2:
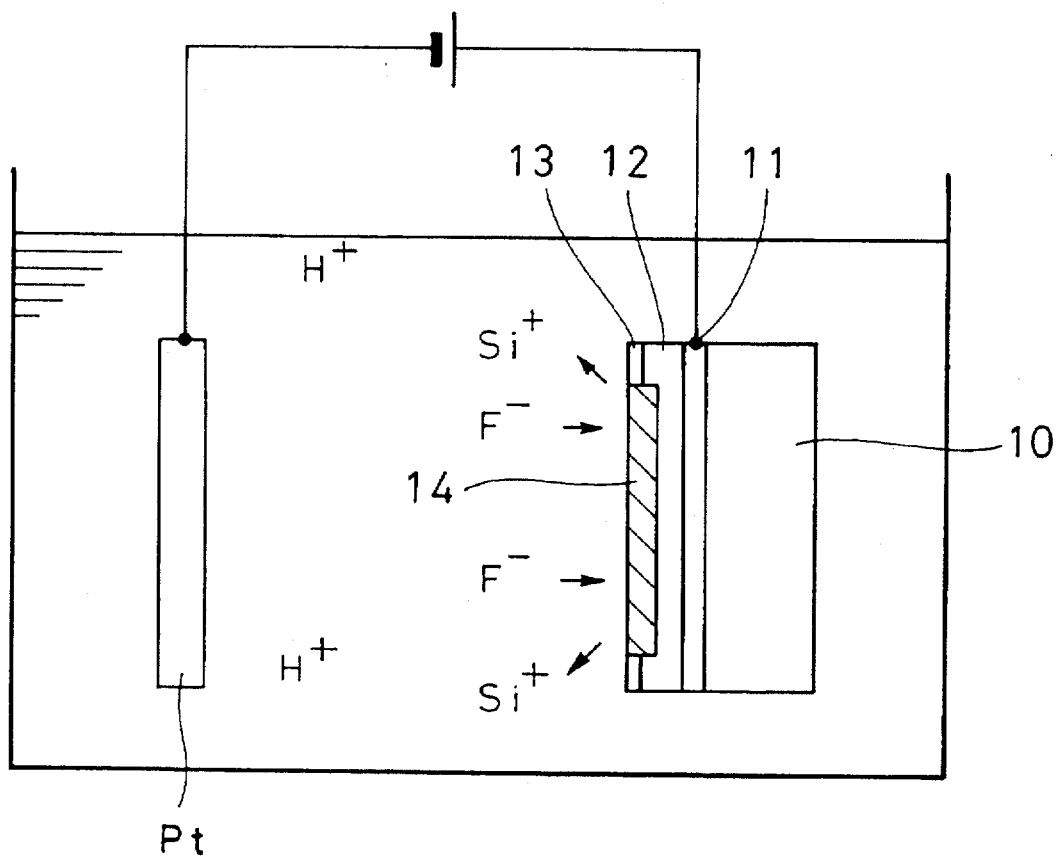
Figure 3:
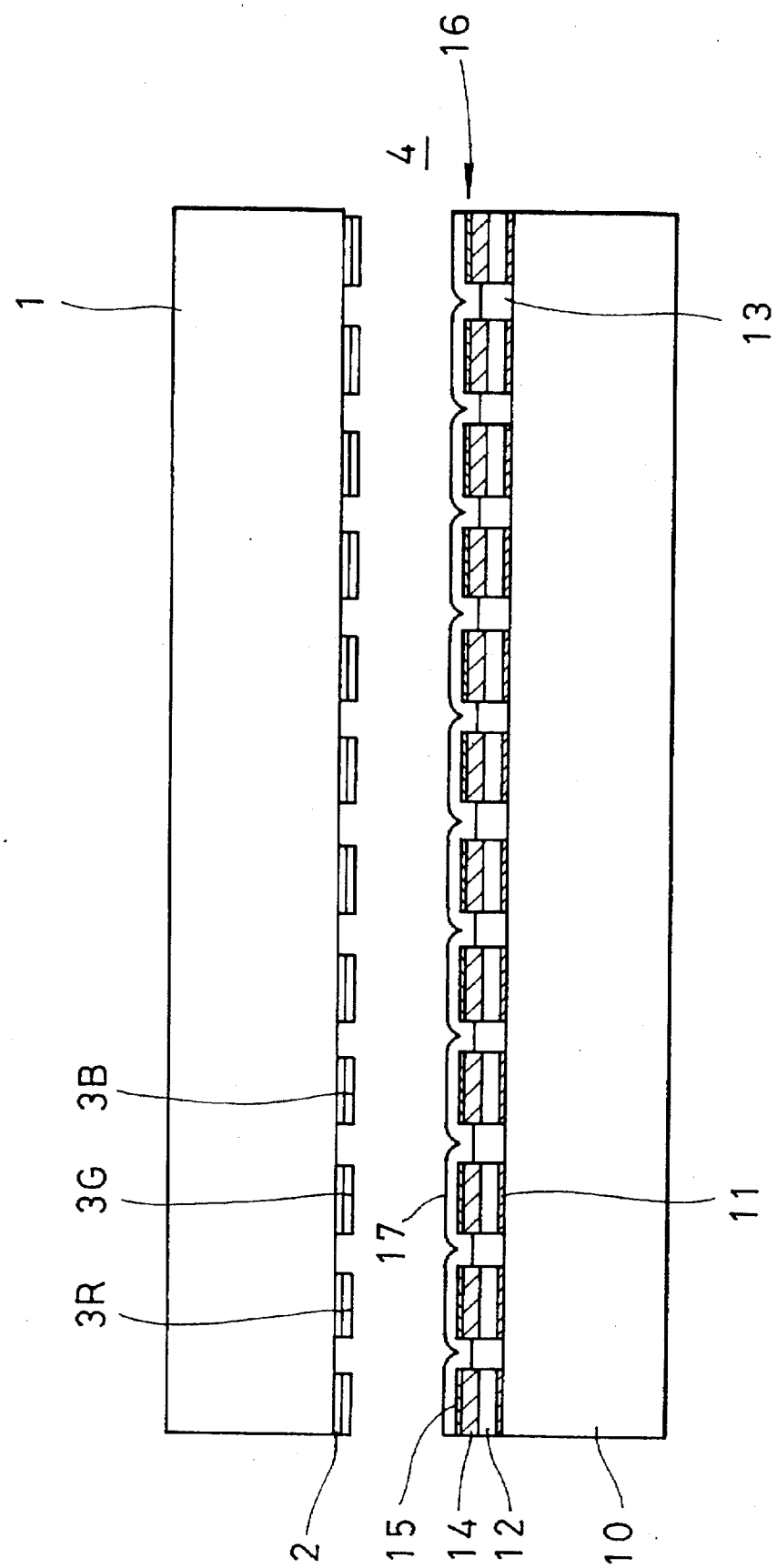
Figure 4:
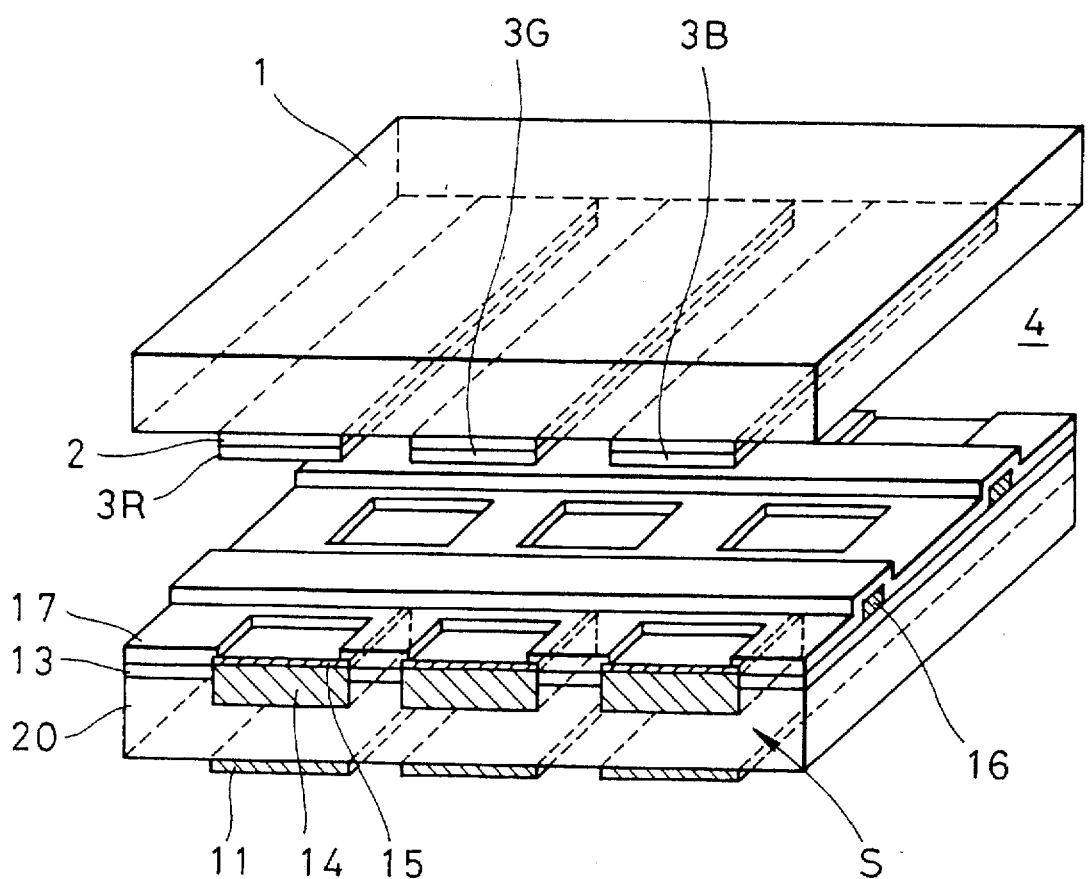
Figure 5:
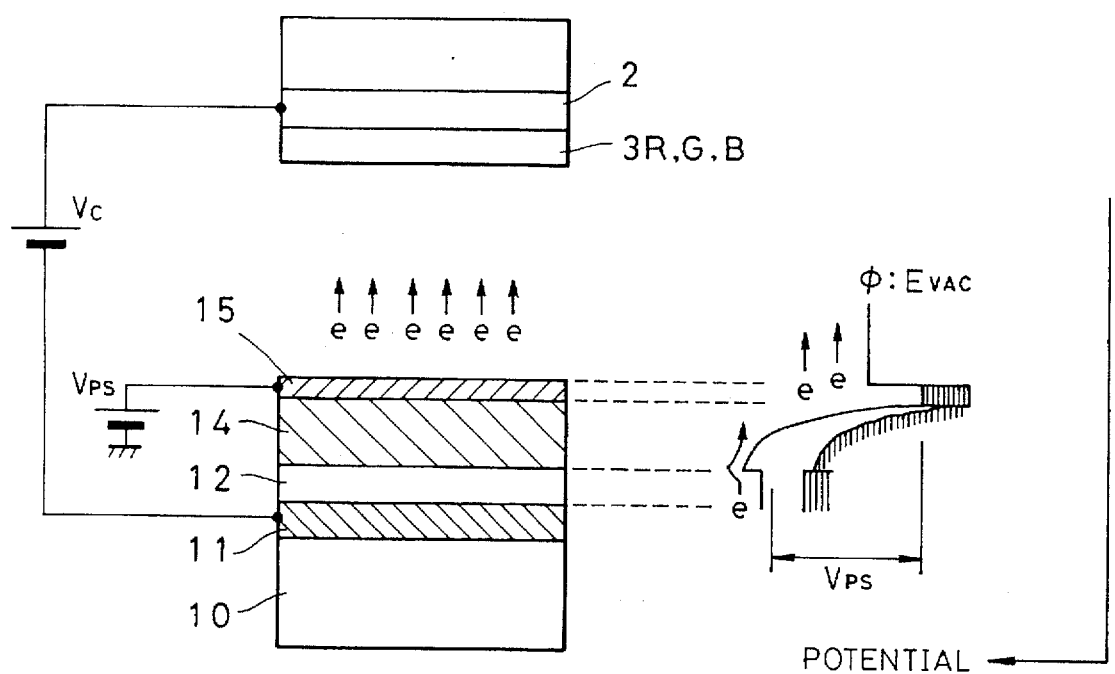
Figure 6:
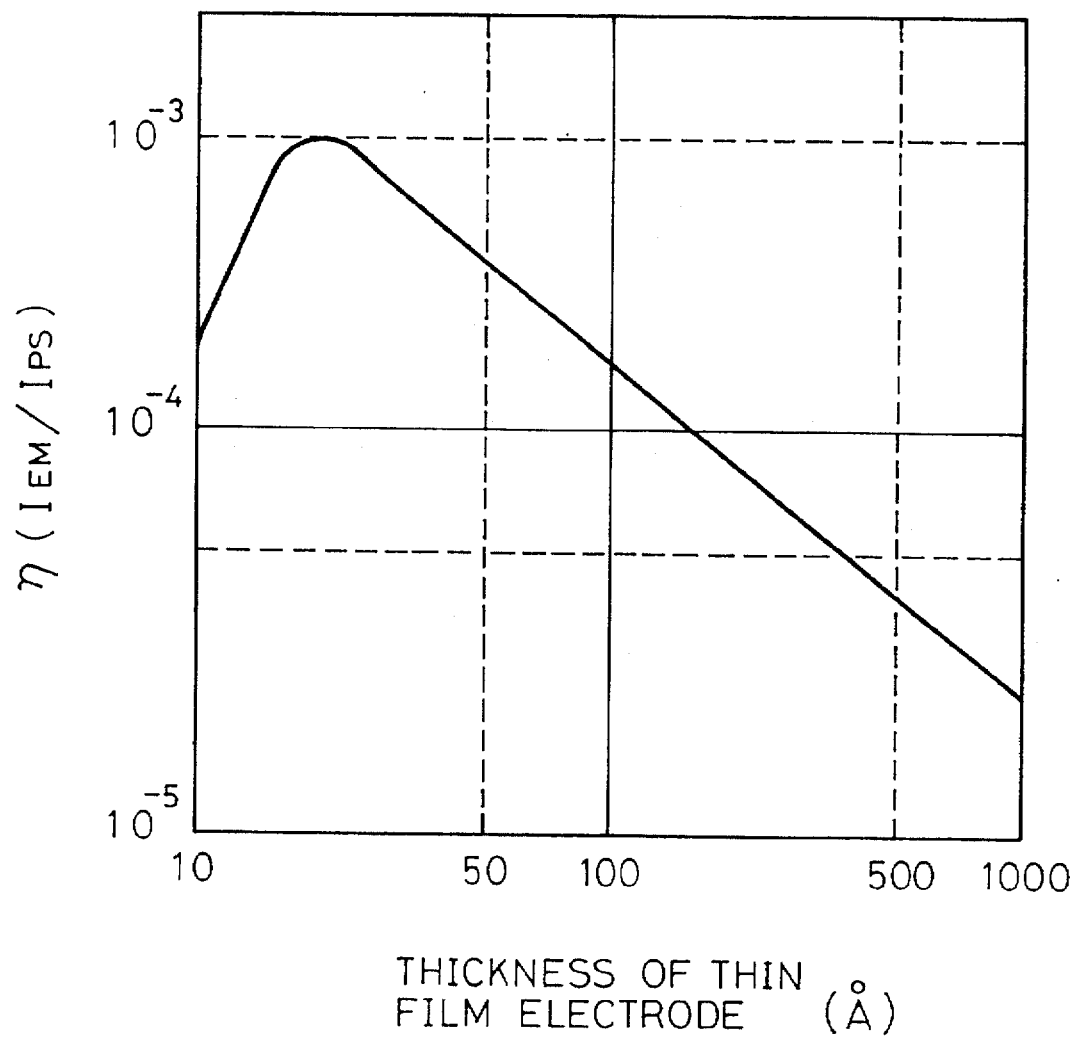
Figure 7:
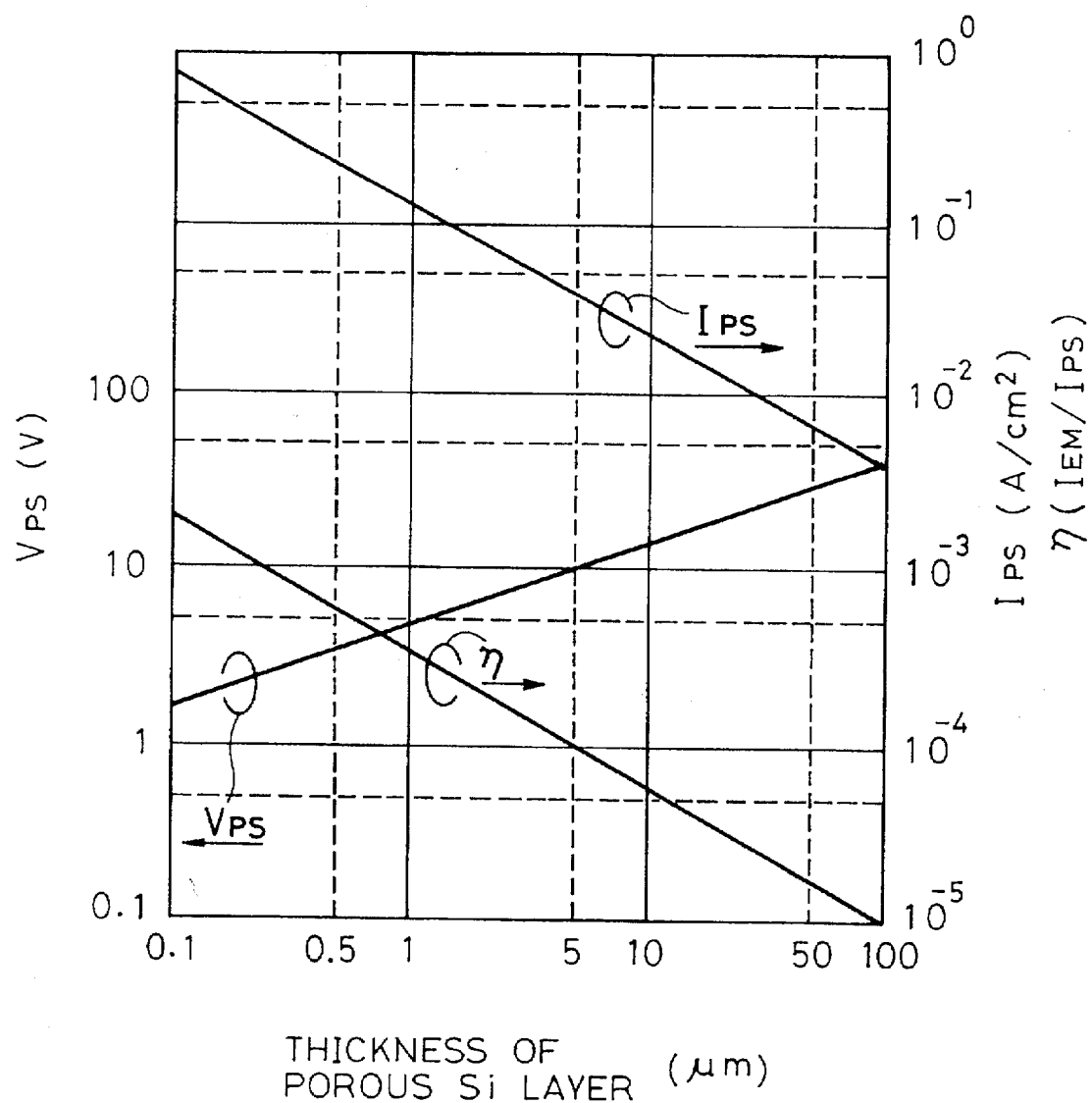

FIG. 2 is a schematic cross-sectional view of a HF (hydrogen fluoride) solution bath accommodating an element-substrate used for an anodic oxidation or anodic treatment method for manufacturing a cold electron emission display device of an embodiment according to the present invention;

FIG. 3 is a schematic cross-sectional view illustrating a cold electron emission display device of another embodiment according to the present invention;

FIG. 4 is a schematic perspective view illustrating a cold electron emission display device of another embodiment according to the present invention;

FIG. 5 is an energy level diagram illustrating electron emission process in a porous silicon layer of an element-substrate of a cold electron emission display device according to the present invention;

FIG. 6 is a graph showing a dependence of electron emission efficiency $\eta$ on thicknesses of a Au (gold) or Pt (platinum) thin film electrode in a cold electron emission display device according to the present invention;

FIG. 7 is a graph showing relationships a positive bias voltage $V_{PS}$ and a diode current $I_{PS}$ and an electron emission efficiency $\eta$ with respect to thicknesses of porous Si layers.

DESCRIPTION OF THE PREFERRED EMBODIMENTS

The embodiments according to the present invention will be described in more detail with reference to the accompanying drawings.

Figure 1:
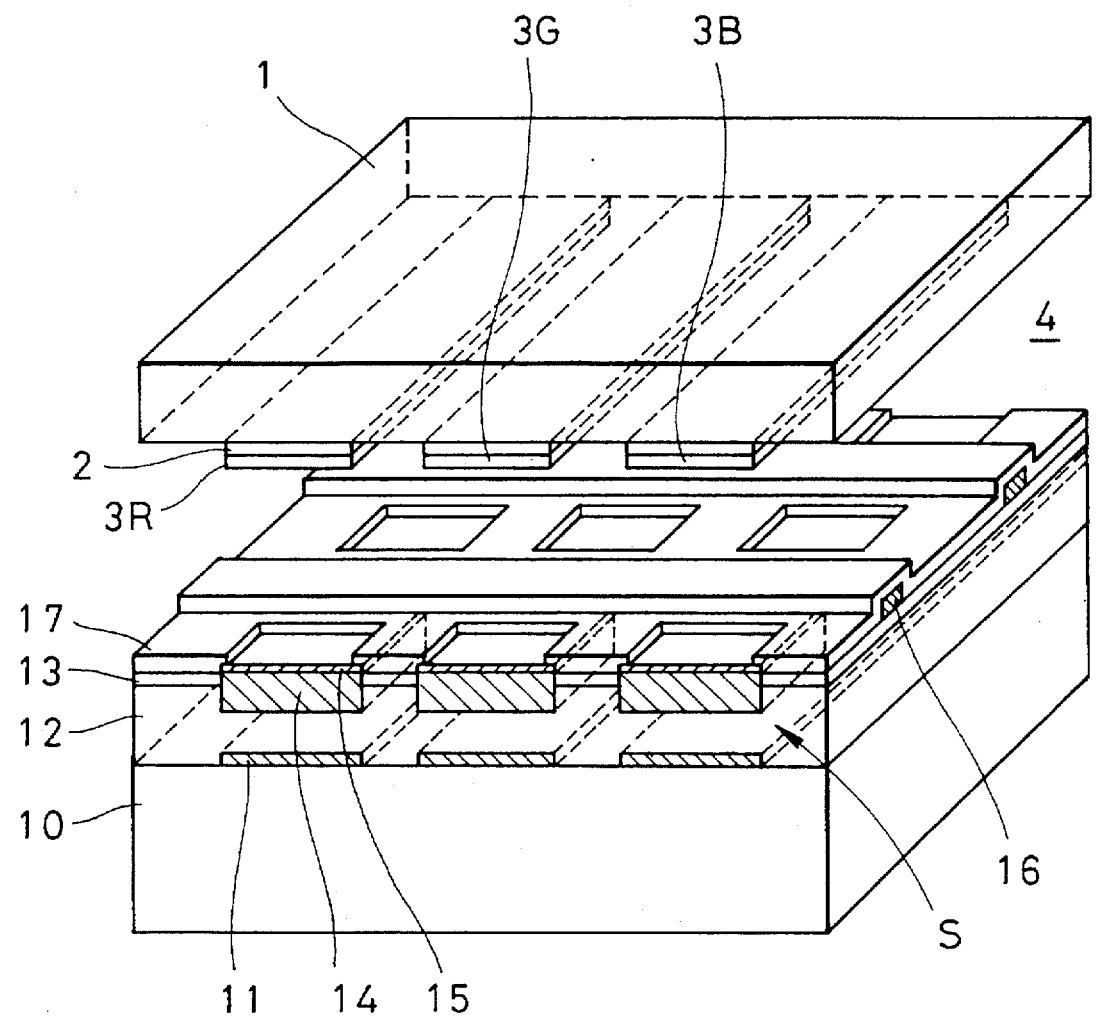
FIG. 1 is a schematic perspective view illustrating a cold electron emission display device of an embodiment according to the present invention.

FIG. 1 shows a cold electron emission display device of one embodiment. This embodiment comprises a pair of transparent substrate 1 and an element-substrate 10, in which these substrates sandwich a vacuum space 4 and face to each other. In the illustrated cold electron emission display device, the transparent substrate is a transparent front plate 1 as a display surface, an internal surface of which faces to a back plate 10 of the element-substrate. A plurality of transparent collector electrodes 2 for capturing emitted electrons are formed on the internal surface of the front plate 1 parallel to each other. The collector electrodes 2 are made of a light-permeable material such as indium tin oxide (referred to herein as ITO), tin oxide (SnO) or the like. Alternatively, the collector electrodes 2 may be formed integratedly in uniform for a monochrome display. To fabricate a color display panel, the transparent collector electrodes 2 capturing emitted electrons are grouped per three for R, G and B color signals corresponding to emitting portions Red, Green and Blue to which some voltages are applied. Thus, fluorescent material layers 3R, 3G and 3B corresponding to R, G and B emissions are formed on the corresponding collector electrodes 2 in such a manner that each fluorescent layer faces to the vacuum space 4.

On the other hand, the back plate 10 of the element-substrate is made of glass. The element-substrate 10 is provided with a plurality of ohmic electrodes 11 which are disposed on an internal surface facing through the vacuum space 4 to the front plate 1 thereof. The ohmic electrodes 11 extend parallel to each other. A plurality of semiconductor cold electron emission elements S are formed on the ohmic electrodes 11 as a matrix array. Each semiconductor cold electron emission element S comprises a semiconductor layer 12, a porous semiconductor layer 14 and a metallic thin film electrode 15 which are layered in turn on the ohmic electrodes 11. An insulative layer 13 is formed to surround each semiconductor cold electron emission element S so as to electrically insulate them. A plurality of bus electrodes 16 are formed on the insulative layer 13 so as to be overlapped on the metallic thin film electrodes 15 so that they electrically bridge and connect the adjacent metallic thin film electrodes 15 in a direction perpendicular to the ohmic electrodes 11 respectively. The bus electrodes 16 extend parallel to each other. A second insulative layer 17 having openings is formed in such a manner that the metallic thin film electrodes 15 are exposed in the vacuum space 4 to face to the corresponding fluorescent material layers 3R, 3G and 3B.

In addition to glass for the element-substrate 10, ceramics such as $Al_2O_3$, $Si_3N_4$, BN or the like may be used for the element-substrate material.

The material of the ohmic electrodes 11 is selected and used from a group of Au, Pt, Al and the like which are in general used for traces of an integrated circuit with a pertinent thickness for supplying substantially the same current to each element.

The material of the semiconductor layer 12 preferably used is silicone (Si) but not restricted in the present invention. In addition to the semiconductor layer of silicone, there may be used for the semiconductor layer 12 semiconductor materials capable of being treated by means of an anodic treatment method, for example, a single substance or compound semiconductor of Group IV, Group III-V or Group II-VI such as germanium (Ge), silicone carbide (SiC), gallium arsenide (GaAs), phosphoric indium (InP), cadmium selenide (CdSe).

The porous semiconductor layer 14 is formed in the semiconductor layer 12 through the anodic treatment as follows: As shown in FIG. 2, a semiconductor layer 12 of an n-type Si is preformed by an anodic treatment, in which the ohmic electrodes 11, the Si layer 12 and the insulative layer 13 with rectangle openings are previously formed on the element-substrate 10 before the element-substrate 10 is dipped into a hydrogen fluoride (HF) solution bath. Since plural openings are formed on the insulative layer 13 to form porous semiconductor layers in the semiconductor layer 12, the surface of each semiconductor layer 12 is partially exposed in the HF solution. The exposed semiconductor layer 12 as an anode and the cathode of Pt are disposed facing to each other in the HF solution. The anode and cathode are connected to a DC power supply, so that a DC current is applied across these electrodes with a low current density to anodize the exposed semiconductor layer 12. As a result, a p-type porous Si layer 14 is formed in the Si layer 12. In this embodiment, the formation of the porous structure requires the consumption of positive holes and thus the light-irradiation should be preformed during the anodization to supply the positive hole carriers to the exposed semiconductor layer 12. Alternatively, the porous Si layer may be formed on a p-type Si semiconductor layer. In this case, the porous Si layer may be formed even if it is in a dark condition. The porous Si layer is consisted of plural minute channels or open spaces and the residual Si, which has a porosity ranging from 10 to 80%, a channel's diameter ranging from 2 to 100 nm. When the channel's diameter is in the range from approximately 2 to several nano-meters and the dimension of the residual Si is in the range from the number of tens to hundreds of the atoms, it is expected that an electron emission phenomenon occurs due to the quantum size effect. These values may be controlled by the settings of the conditions of the HF density, the current density, the duration of anodization treatment and the light-irradiation time period during the anodic treatment. The electron emission of the porous Si layer is grater in several fingers than that of the Si layer.

A crystalline, amorphous, poly-crystalline, n-type or p-type Si layer may be used through the anodization. When employing the crystalline for the Si layer 12, the crystal substrate having its surface (100) direction orientating perpendicular to its major surface is preferably used, because the electron emission efficiency η of the porous Si layer is better. It is estimated that such a (100) Si layer provides the Si crystalline direction and the minute channel with a nano-order diameter which orientate perpendicular to its major surface. In addition, the employment of the porous Si layer made from the amorphous Si layer provides amorphous residual Si and minute channels.

The internal diameter of the minute channel in the surface of the porous Si layer is comparatively large, but such internal diameter of the minute channel gradually decreases as its depth becomes deeper. Thus, the porous Si layer 14 has a high resistivity at a portion adjacent to its surface and a low resistivity at a portion adjacent to its interface between the porous Si layer 14 and the Si layer 12. This incline of resistivity in the porous Si layer 14 is preferable for the injection of electrons from the substrate.

The material having a low work function ø is preferably used for the thin film electrode 15 in the basis of the principle of electron emission. In addition, a thinner film electrode 15 is preferable for the injection of electrons from the substrate. To increase the electron emission efficiency η, metals Group I and Group II in the periodic law table are efficient to the thin film electrode 15, for example, Cs, Rb, Li, Sr and the like or the alloy thereof. Moreover, a chemically stable metal with a high conductivity such as Au, Pt, Lu, Ag, Cu and the like or the alloy thereof is also preferably used for the thinner film electrode 15. In addition, the thin film electrode 15 may be constructed as a two-layer structure, i.e., a low work function metal layer is deposited or laminated on an electrode layer made of one or more selected from these high conductive metals. Alternatively, the thin film electrode 15 may be formed in such a manner that the low work function metal is doped into the thin film electrode layer made of one or more selected from these high conductive metals.

The material of the bus electrodes 16 is employed from a group of Au, Pt, Al and the like which are in general used for traces of an integrated circuit. The bus electrode has a pertinent fat thickness e.g., 0.1 to 50 micrometers for supplying substantially the same current to the emission elements.

The structure of this surface cold electron emission element on the element-substrate is fabricated through the following procedure. First, Ohmic electrodes 11 are formed on the element-substrate 10 as a parallel stripe pattern through the sputtering method. An n-type Si layer 12 is uniformly formed on the plural ohmic electrodes through the sputtering method or the chemical vapor deposition (CVD) method. Next, an insulative layer 13 is formed on or in the Si layer 12 in such a manner that its openings are aligned over the ohmic electrodes 11 at a predetermined interval to make an aperture matrix of the openings for individual electron emission regions. Namely, the openings or windows for the n-type Si layer 12 in the insulative layer 13 are effective to the anodic treatment which will be mentioned below so that passivation of the Si layer surface is preformed except for the surface cold electron emission elements on the ohmic electrodes 11 which will be disposed in the islands form. This arrangement improves to prevent the cross-talk between the elements.

After that, as shown in FIG. 2, the exposed Si surfaces from the insulative layer 13 are anodized under the pertinent conditions so that island shape porous Si layers 14 are formed in which dangling bonds existing in the internal walls of the minute channels are terminated by hydrogen during the anodization.

In this case, there is a possibility that the hydrogen terminations in the internal walls of the minute channels are combined to oxygens in the air so that —OH and/or $H_2O$ occurs. The —OH and/or $H_2O$ causes the deterioration of the porous Si layer 14. To stabilize the porous Si layer 14, the element-substrate 10 is put into the vacuum heating to remove such hydrogen terminations and then carried to the heating condition in an oxygen and nitrogen gaseous atmosphere to form —O or —N terminations instead of the hydrogen terminations. Alternatively, this replacement of the O or N termination may be performed by the plasma treatment under the oxygen and nitrogen gaseous condition.

Thin film electrodes 15 with a high electron emission efficiency each made of conductive material such as Au, Pt and the like are formed on the island porous Si layers 14 respectively and correspondingly to the ohmic electrodes.

Next, thick film bus electrodes 16 made of a low resistance metal is formed on the adjacent thin film electrodes 15 along the sides thereof in an overlapped manner as lead lines to equalize the electric potential therebetween. The island shape metallic thin film electrodes 15 are electrically bridged by the bus electrodes arranged perpendicular to the ohmic electrodes 11.

Next, a second insulative layer 17 with openings is formed on the surface of the metallic thin film electrode 15 to define a plurality of electron emission regions by its openings. This second insulative layer 17 covers the bus electrodes 16 to prevent any unwanted short circuit, but exposes thin film electrodes 15 through its openings.

In the above embodiment, the semiconductor layer 12 is formed in common on the ohmic electrodes 11. In addition to this, as shown in FIG. 3, individual semiconductor layers may be formed separately as a group of islands matrix arranged, so that semiconductor cold electron emission elements may be formed independently on the ohmic electrodes per its line.

In another embodiment, as shown in FIG. 4, instead of the glass substrate 10 of the element-substrate, a semiconductor wafer 20 may be used for the element-substrate, e.g., an n-type Si wafer as it is. In this case, the semiconductor layer 20 is the substrate per se, on the back-face of which the ohmic electrodes 11 and the other members are fabricated as described above.

Each element of the cold electron emission display device is driven as shown in FIG. 5 in which a positive bias voltage $V_{PS}$ is applied to the thin film electrode 15 while a higher voltage $V_C$ is applied across the ohmic electrodes 11 and the transparent collector electrode 2. As shown in the figure, when electrons are injected from the ohmic electrodes 11 to the semiconductor layer 12, a diode current $I_{PS}$ flows in the element. The most of the resultant electric field is applied to the porous semiconductor layer 14 since the porous semiconductor layer 14 has a high resistance value. The intensity of the electric field is therefore stronger at a portion adjacent to the outer surface of porous semiconductor layer 14 as shown in an energy level diagram (the right hand of FIG. 5). Thus the injected electrons drift and travel toward the metallic thin film electrode 15 in the porous semiconductor layer 14. Portions of the electrons coming to the metallic thin film electrode 15 pass through the metallic thin film electrode as a tunnel effect cased by the high intensity of the electric field of the porous semiconductor layer 14 and then these electrons go out the vacuum space. In this way, the electrons e (emission current $I_{EM}$) emitted from the thin film electrode 15 by the tunnel effect are accelerated under the high voltage $V_C$ applied to the transparent collector electrode 2, so that the accelerated electrons impinge upon the fluorescent material 3R, 3G or 3B disposed on the collector electrode to emit a visible R, G or B light. The thin film electrodes 15 as electron emission surfaces and the fat film electrodes 16 as bus lead lines are provided to improve the electron emission efficiency η ($\eta = I_{EM}/I_{PS}$).

The porous Si layer 14 and the thin film electrode 15 utilize the electron emission or the tunnel effect of electrons. Therefore, the thinner the thickness of the thin film electrodes is, the better is for the tunnel effect. On the other hand, the range of thickness of the thin film electrode should be secured in the basis of an actual device. Inventors have made the experiments and studied for thickness dependence of Au or Pt thin film electrodes versus the electron emission efficiency η. FIG. 6 shows a characteristic of the dependence of electron emission efficiency η v.s. thicknesses of the Au or Pt thin film electrode in the cold electron emission display device. The Au or Pt thin film electrode having a thickness ranging from 10 to 500 angstroms makes practicable the display device with an pertinent efficiency. In view of stability of the element, the Au or Pt thin film electrode thickness is preferably from 20 to 200 angstroms. The peak of the electron emission efficiency η is $10^{-4}$ or more at the 20 angstroms thickness.

Inventors have furthermore investigated the relationships a positive bias voltage $V_{PS}$ and a diode current $I_{PS}$ and an electron emission efficiency η with respect to thicknesses of porous Si layers and the porous Si layer. FIG. 7 shows those results. In view of FIGS. 6 and 7, it is found that the emission of electrons occurs near the outer surface of the porous Si layer. Therefore, the thin porous Si layer is preferable for the efficiency. However, in view of the uniformity and stability of the element, it is necessary to a pertinent thickness is decided. When a driving voltage (nearly equal to $V_{PS}$) is set up to 30V or less in actual on the basis of the material of the Si layer and the conditions for making the porous, the thickness of the porous Si layer is selected from the range from 0.1 to 50 micrometers because its electron emission efficiency η exceeds a value of $10^{-5}$.

A cold electron emission display device of a type shown in FIG. 4 has been fabricated.

There is prepared an n-type silicone substrate (resistivity= 0.0018 Ω cm) cut out from an n-type silicone wafer of surface orientation (111). Ohmic electrodes of Au are formed on the back-face of the substrate. An insulative layer having openings are formed in the front-face of the substrate in such a manner that openings are aligned over the ohmic electrodes at a predetermined interval for individual electron emission regions. The substrate is dipped and anodized in a mixed liquid consisting a 50 wt. % HF aqueous solution and ethanol (the mixed ratio is 1:1) under the conditions that light is irradiated to the dipped substrate by using a 500 w tungsten lamp spaced at a 20 cm distance, at a current density of 100 mA/cm² applied across the substrate and a Pt cathode for five minutes. An anodized substrate having 6×6mm² porous silicone layers is obtained in which the average thickness of each porous Si layer is approximately 40 micrometers.

Next, thin film electrodes of Au are vacuum-deposited on the surfaces of the rectangle porous Si layers at a thickness of 15 nm by using a pertinent mask and then bus electrodes are similarly formed at several micrometers. The resultant cold electron emission elements of the element-substrate are wired as a diode in such a manner that the Au thin film electrodes are a positive electric potential $V_{PS}$ and the Au ohmic electrodes are a ground electric potential.

Next, collector electrodes of ITO are formed on a transparent glass substrate. Fluorescent material layers corresponding to R, G and B emissions are formed on the corresponding collector electrodes. After that, the transparent glass substrate and the element-substrate are assembled in a manner that the thin film electrodes and the collector electrodes are supported to face parallel to each other through a vacuum space at a 10 mm spacings via spacers and then a vacuum of $10^{-7}$ Torr or $10^{-5}$ Pa is maintained in the spacings.

The performance of the resultant cold electron emission display device was measured at a $V_{PS}$ 100 V and a diode current $I_{PS}$ 4 mA/cm². As a result, the emission current $I_{EM}$ was approximately 0.24 mA/cm² and the electron emission efficiency η was $6 \times 10^{-9}$.

In addition, when a Si substrate with surface orientation (100) was anodized at a current density 50 mA/cm² and a treatment period of from 5 to 1 minutes, the thicknesses of 5 to 10 micrometers of the porous Si layers were obtained. A cold electron emission display device including this Si substrate provided an electron emission efficiency η of $10^{-4}$ at a $V_{PS}$ of from 10 to 20 Volts.

When applying a voltage approximately 4kV across the collector electrodes with a fluorescent material and the thin film electrodes of the resultant cold electron emission display device, it were observed that the device projected uniform fluorescent patterns correspondingly to the thin film electrodes. In this way, it was found that the electron emission from the porous Si layer was uniform.

As mentioned above, according to the present invention, a cold electron emission display device with a simple structure and a high light-emitting efficiency is obtained without any minute, complicated shape cathode.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A cold electron emission display device comprising;

a pair of an element-substrate and a transparent substrate sandwiching a vacuum space and facing to each other;

a plurality of ohmic electrodes disposed on said element-substrate parallel to each other;

a plurality of cold electron emission elements of semiconductor each comprising;

a semiconductor layer formed on said ohmic electrode;

a porous semiconductor layer formed on said semiconductor layer; and a metallic thin film electrode formed on said porous semiconductor layer to face said vacuum space;

a plurality of bus electrodes formed on said metallic thin film electrodes for bridging and electrically connecting the adjacent metallic thin film electrodes and extending perpendicular to said ohmic electrodes;

a plurality of collector electrode disposed on said transparent substrate parallel to each other for capturing emitted electrons from said metallic thin film electrode; and a fluorescent layer formed on said collector electrode.

2. A cold electron emission display device according to claim 1 wherein, said porous semiconductor layer is formed by using an anodic treatment on the surface of said semiconductor layer to form minute channel as a porous layer.

3. A cold electron emission display device according to claim 1 further comprising an insulative layer defining a plurality of said porous semiconductor layer.

4. A cold electron emission display device according to claim 1 further comprising a second insulative layer defining a plurality of electron emission regions on the surface of said metallic thin film electrode.

5. A cold electron emission display device according to claim 4 wherein, said second insulative layer covers said bus electrodes.

6. A cold electron emission display device according to claim 1 wherein, said ohmic electrodes are formed an internal wall of said element-substrate.

7. A cold electron emission display device according to claim 1 wherein, said element-substrate is said semiconductor layer per se, on the back-face of which said ohmic electrodes are formed.

8. A cold electron emission display device according to claim 1 wherein, said metallic thin film electrodes are island-shaped separately and connected to said bus electrodes.

9. A cold electron emission display device according to claim 1 wherein, said semiconductor layers are formed in common on said ohmic electrodes.

10. A cold electron emission display device according to claim 1 wherein, said semiconductor cold electron emission elements are separately formed per said ohmic electrode.

11. A cold electron emission display device according to claim 1 wherein, said semiconductor layer is made of silicone, said porous semiconductor layer is made of porous silicone, said metallic thin film electrode is selected from Au, Pt, Ag, Cu or an alloy of individuals thereof.

* * * * *

UNITED STATES PATENT AND TRADEMARK OFFICE
CERTIFICATE OF CORRECTION

PATENT NO.   : 5,894,189
DATED        : April 13, 1999
INVENTOR(S)  : Kiyohide OGASAWARA and Takamasa YOSHIKAWA It is certified that error appears in the above-identified patent and that said Letters Patent is hereby corrected as shown below:

On the title page:

[73]   Assignee:   Pioneer Electronic Corporation and Nobuyoshi KOSHIDA
both of Japan Signed and Sealed this Fourteenth Day of December, 1999

Attest:

Q. TODD DICKINSON

*Attesting Officer*      *Acting Commissioner of Patents and Trademarks*